Sept. 14, 1943.                L. HANSSEN                 2,329,439
                                HAND TRUCK
                            Filed Feb. 9, 1942           2 Sheets-Sheet 1

INVENTOR
Leif Hanssen,
BY
Bean, Brooks, Buckley & Bean.
ATTORNEYS

Sept. 14, 1943.   L. HANSSEN   2,329,439
HAND TRUCK
Filed Feb. 9, 1942   2 Sheets-Sheet 2
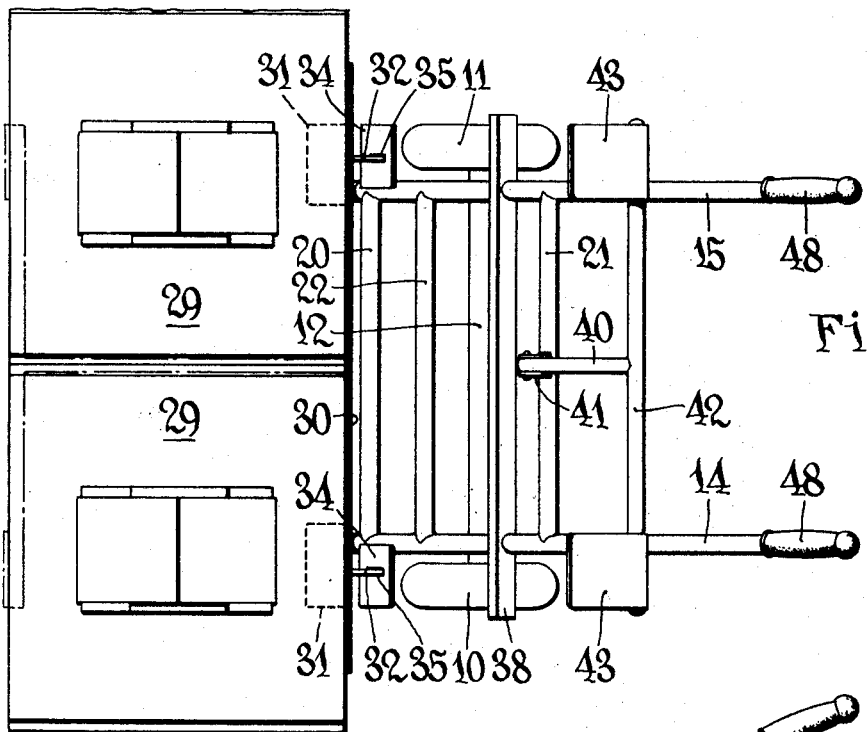
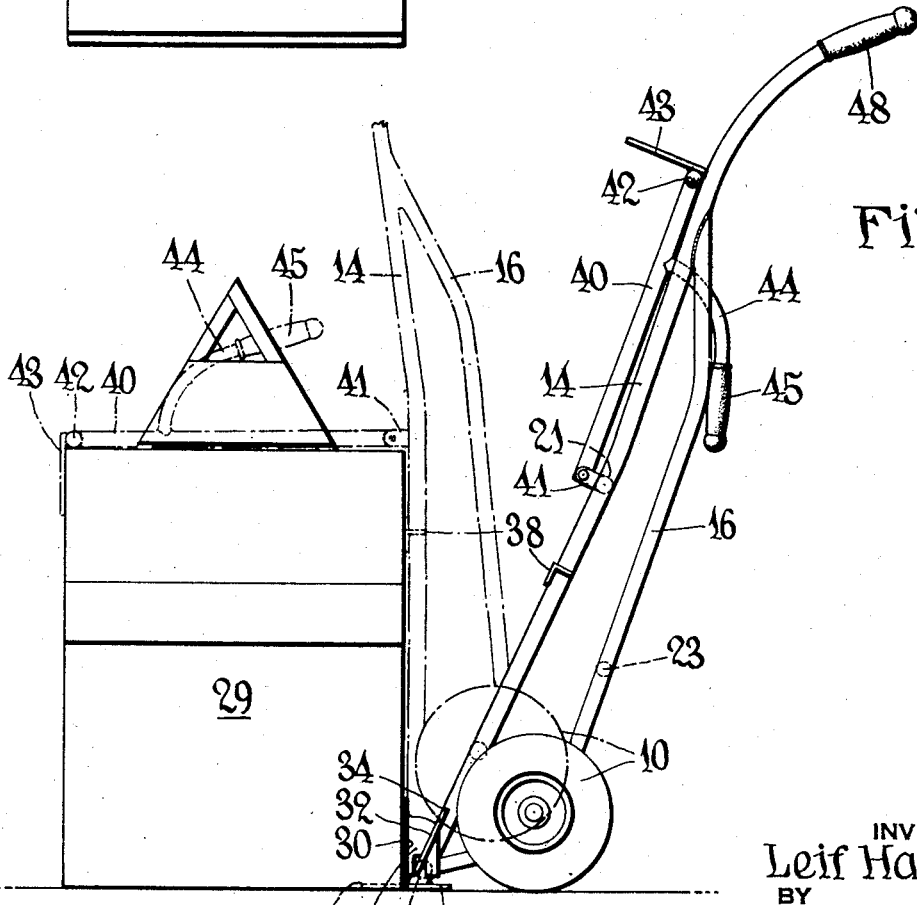
INVENTOR
Leif Hanssen,
BY
Bean, Brooks, Buckley & Bean.
ATTORNEYS Patented Sept. 14, 1943

2,329,439

UNITED STATES PATENT OFFICE 2,329,439

HAND TRUCK

Leif Hanssen, Kenmore, N. Y., assignor to Buffalo Electro-Chemical Company, Inc., Tonawanda, N. Y.

Application February 9, 1942, Serial No. 430,078

4 Claims. (Cl. 214—65.4)

This invention relates to article handling apparatus and particularly to a novel hand truck.

According to the present invention hand trucking means are provided which possess various advantages of ruggedness, facility of manufacture, and convenience and safety in use. The general framework of my improved trucking means is of welded tube construction and arranged to afford high relative strength and rigidity with a minimum of weight and mass.

In handling articles of substantial weight by the use of hand trucks the matter of safety is an important one. Pursuance of the teachings of the present invention insures a maximum of safety to the operator and to others, without sacrificing ease, convenience and facility of operation.

Other advantages incident to use of the novel hand truck of my invention will appear from a consideration of the ensuing specification taken in connection with the accompanying drawings. While a single complete and specific embodiment of my invention is set forth herein by way of example, it is to be understood that many mechanical variations will occur to those skilled in the art and the spirit and scope of my invention is not to be considered limited otherwise than as defined in the appended claims.

In the drawings:

Fig. 2 is a top plan view of the hand truck of Fig. 1, shown in a different position of use;

Fig. 3 is a side elevational view showing the device in the position of Fig. 2.

Figure 1:
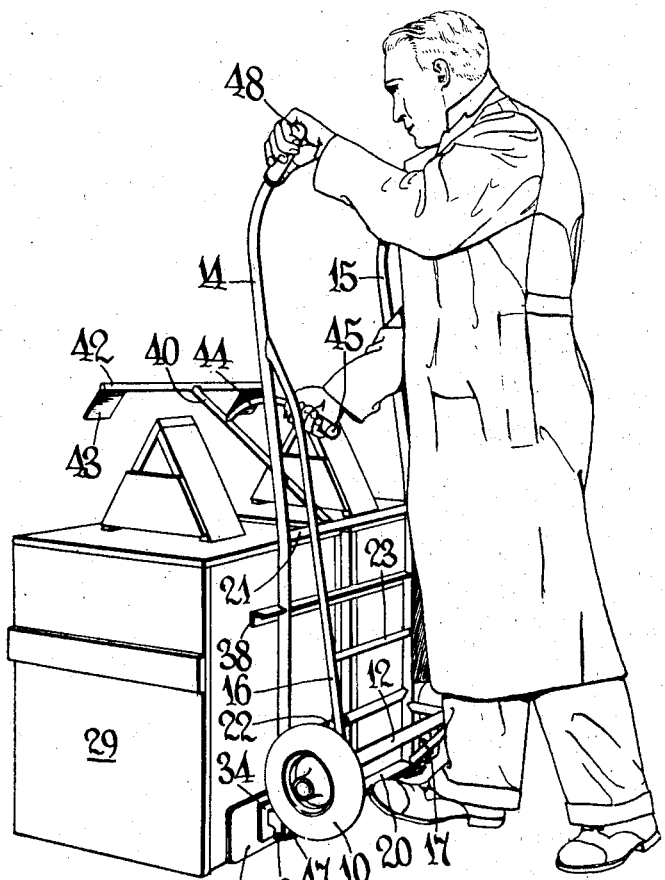
Fig. 1 is a general perspective view showing the exemplary form of the device in use.

Throughout the several figures of the drawings like characters of reference denote like parts and the numerals 10 and 11 designate a pair of coaxial ground wheels mounted upon an axle 12. In the illustrated instance the axle 12 comprises a fixed part of the rigid framework of the device and the wheels 10 and 11 are rotatably positioned upon the opposite terminal portion of the axle and held against axial displacement in any convenient manner.

The general framework of the device comprises primarily a pair of spaced, substantially parallel side frame bars 14 and 15, each reinforced to provide a substantial beam cross section by the provision of bars 16 and 17, respectively. The bars 16 and 17, as well as those designated 14 and 15, are preferably tubular in form and the pair of bars 16 and 17 are secured at their opposite ends to the main frame bars 14 and 15, respectively, by welding or the like, and the intermediate portions of the bars 16 and 17 are spaced substantially from the bars 14 and 15 to provide composite beam cross sections of substantial depth, particularly at those points along the length of the framework where the bending moments resulting from imposed loads are most severe.

The two composite side frame units 14, 16 and 15, 17 respectively are held in rigid, spaced, substantially parallel relationship by a lower cross member 20, an upper cross member 21, an intermediate cross member 22, a cross member 23 extending between the frame bars 16 and 17, and the axle 12, all of which elements are securely welded into an integral rigid unit. The cross member 23 is placed so that it may be conveniently used as a foot bar to facilitate tipping the load at the beginning and end of a trucking operation. Truss struts 24 are preferably provided and may extend between each pair of frame bars 14, 16 and 15, 17 adjacent the axle 12. The truss struts 24 are likewise preferably welded to the framework at their opposite ends.

Figure 4:
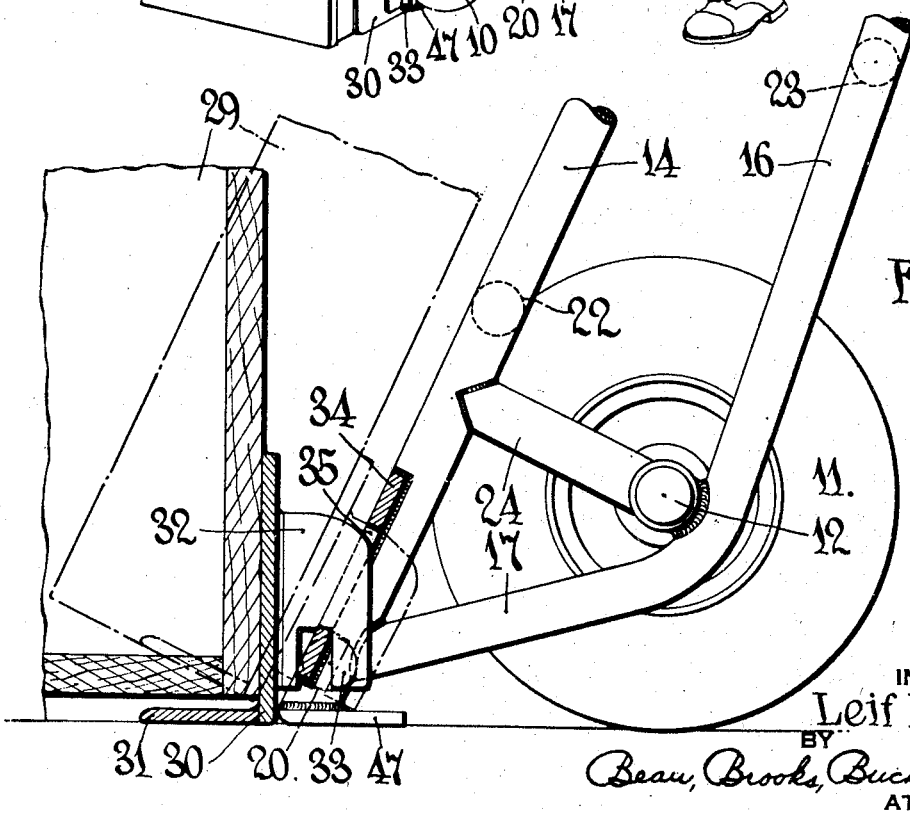
Fig. 4 is a fragmentary elevational view similar to Fig. 3 but on an enlarged scale and showing only the lower portion of the device with the near wheel removed and parts in cross section.

In the form of invention set forth by way of example arrangement is made to handle two crates which are relatively square in plan view and each designated 29 in the drawings. For supporting engagement beneath the crates 29 an elongate support 30 of angular cross section is provided. The bottom flange of the support 30 is adapted to extend beneath the crate 29, as appears best from Fig. 4, and in the particular instance illustrated the bottom flange of the angular support 30 is interrupted, so as to present a pair of supporting feet or plates 31, each adapted to engage substantially centrally beneath a crate 29.

The upright flange of the support 30 has a pair of brackets 32 rigidly associated with the rear wall thereof, as by welding or the like. The brackets 32 have their lower edges notched to provide depending tongues 33. Each of the frame bars 14 and 15 is provided with a rigid outwardly projecting plate portion 34, perforated as at 35 to receive one of the depending tongues 33. By virtue of this mode of engagement the support 30 may move pivotally with respect to the framework of the truck proper, from the full line position of Fig. 4 to the position there indicated in dot and dash lines.

Further support for the rear walls of the crates 29 is afforded by the provision of a cross rail 38 which is rigidly associated with the frame bars 14 and 15 and serves additionally to brace and rigidify the framework. In the illustrated instance the rail 38 is of angular cross section whereby a leg thereof offers a relatively broad bearing surface for the crates.

Means are further provided for fixing the crates 29 with respect to the framework of the truck for subsequent rocking movement of the truck and crates to convenient position for trucking movement and such means may comprise an arm 40 pivotally attached at its inner end to a yoke 41 rigidly secured to the upper cross member 21. The outer end of the arm 40 has secured thereto a bar 42. In the present instance the bar 42 is attached to the arm 40 substantially centrally of its length and its laterally projecting terminal portions are provided with depending gripping or retaining plates 43. An upwardly and rearwardly projecting bar 44 is attached to the arm 40 and terminates in a handle 45 for manual pivotal movement of the arm 40 and the bar 42 with its retaining plates 43. Obviously, the particular arrangement of the arm 40, the bar 42, the plates 43, and the feet or plates 31 of the support 30 is dictated by the nature of the crates to be handled and may be varied to suit variations in requirements of use.

The idle or rest position of the assembly comprising the arm 40, the bar 42 and the retaining plates is shown in full lines in Fig. 3. After the truck frame proper has been moved to the dot and dash line position of Fig. 3, this being the position illustrated in Fig. 1, the retaining plate assembly may be moved to the dot and dash line position of Fig. 3. Fig. 1 illustrates this movement in the process of being accomplished. The retaining plate assembly thus serves, without more, to retain the crates 29 in their proper position on the angular support 30.

It will be noted that movement of the main truck frame to the dot and dash line position of Fig. 3 is effected by pivotal movement thereof about the lower ends of the principal frame bars 14 and 15 and to this end the lower ends of such bars are provided with bearing shoes or plates 47. During such pivotal movement of the main truck frame the support 30 remains in the position illustrated in Figs. 3 and 4, by reason of its pivotal connection with the main truck frame. When, however, the main truck frame is again rocked rearwardly, to bring it to a position for convenient wheeling movement, the support 30 is fixed for movement with the main truck frame by the presence of the crates 29, and the support 30 therefore is moved to, and in fact rearwardly beyond, the dot and dash line position of Fig. 4. For convenient manipulation of the truck, handles 48 are provided at the upper ends of the main frame bars 14 and 15.

What is claimed is:

1. Manual trucking means comprising an elongate frame, wheels adjacent a lower end thereof for rolling movement of the trucking means and handle means at the opposite end thereof, an angular support for receiving a lower edge of an article to be carried, one leg of said support being positioned to extend beneath the article to be carried and the other upwardly along a wall thereof, means mounting said support for pivotal movement on an axis parallel to the axis of said wheels, and clamp means for engaging the upper portion of a crate to retain the same against said frame, said clamp means comprising an arm movably carried by said frame at one end, the other end of said arm carrying a retaining plate disposable against a wall of said article opposite to said lower edge.

2. Manual trucking means comprising a pair of spaced frame members, each comprising an elongate bar having a gripping handle at one end, an elongate brace secured at one of its ends to the other end of said bar and extending sharply divergently therefrom then gradually convergently to a meeting point with said bar at a medial point therealong to form a rigid triangular truss, the point of maximum spacing of said bar and said brace occurring relatively close to said other end of said bar, and wheel supporting means rigidly secured to said brace adjacent said point of maximum spacing, means connecting said spaced frame members to form a rigid frame, and a pair of wheels, one carried rotatably by each of said wheel support means.

3. Manual trucking means comprising a pair of spaced frame members, each comprising an elongate bar having a gripping handle at one end, an elongate brace secured at one of its ends to the other end of said bar and extending sharply divergently therefrom then gradually convergently to a meeting point with said bar at a medial point therealong to form a rigid triangular truss, the point of maximum spacing of said bar and said brace occurring relatively close to said other end of said bar, and a strut extending rigidly between said bar and said brace adjacent said point of maximum spacing, and wheel supporting means rigidly secured to each of said frame members adjacent each of said struts, means connecting said spaced frame members to form a rigid frame, and a pair of wheels, one carried rotatably by each of said wheel supporting means.

4. Manual trucking means comprising a pair of spaced frame members, each comprising an elongate bar having a gripping handle at one end, an elongate brace secured at one of its ends to the other end of said bar and extending sharply divergently therefrom then gradually convergently to a meeting point with said bar at a medial point therealong to form a rigid triangular truss, the point of maximum spacing of said bar and said brace occurring relatively close to said other end of said bar, and wheel supporting means rigidly secured to said brace adjacent said point of maximum spacing, means connecting said spaced frame members to form a rigid frame, and a pair of wheels, one carried rotatably by each of said wheel supporting means, and means supported at said other ends of said bars for engagement with an article to be trucked.

LEIF HANSSEN.